(12) United States Patent
Meriaz et al.

(10) Patent No.: US 10,691,164 B2
(45) Date of Patent: Jun. 23, 2020

(54) DEVICE FOR COORDINATED USE OF MULTIPLE MOBILE COMPUTING DEVICES

(71) Applicant: MBTE Holdings Sweden AB, Goeteborg (SE)

(72) Inventors: Ran Meriaz, Warner Robbins, GA (US); Yoram Meriaz, Tel-Aviv (IL); Alex Tkachman, Holon (IL)

(73) Assignee: MBTE Holdings Sweden AB, Goeteborg (SE)

( * ) Notice: Subject to any disclaimer, the term of this patent is extended or adjusted under 35 U.S.C. 154(b) by 228 days.

(21) Appl. No.: 15/728,848

(22) Filed: Oct. 10, 2017

(65) Prior Publication Data
US 2018/0101195 A1    Apr. 12, 2018

Related U.S. Application Data
(60) Provisional application No. 62/406,039, filed on Oct. 10, 2016.

(51) Int. Cl.
*G06F 1/16* (2006.01)
(52) U.S. Cl.
CPC .......... *G06F 1/1615* (2013.01); *G06F 1/1654* (2013.01); *G06F 1/1681* (2013.01); *G06F 1/1683* (2013.01)
(58) Field of Classification Search
CPC ...... G06F 1/163; G06F 1/1615; G06F 1/1681; G06F 1/1652; G06F 1/1632; G06F 1/16; G06F 1/1616; G06F 1/1637; G06F 1/1647; G06F 1/1654; G06F 1/1683; H05K 5/0017; H05K 5/0086
See application file for complete search history.

(56) References Cited

U.S. PATENT DOCUMENTS

| | | | | |
|---|---|---|---|---|
| 4,195,431 A | * | 4/1980 | Neufeld | B42F 5/00 40/367 |
| 5,273,319 A | * | 12/1993 | Lee | B42F 13/002 281/19.1 |
| 5,534,888 A | * | 7/1996 | Lebby | G06F 1/1647 345/672 |
| 5,847,698 A | * | 12/1998 | Reavey | G06F 15/0283 345/173 |
| 7,708,240 B2 | * | 5/2010 | Homer | G06F 1/1601 248/130 |

(Continued)

FOREIGN PATENT DOCUMENTS

WO    WO-2013129717 A1 * 9/2013

*Primary Examiner* — Adrian S Wilson
(74) *Attorney, Agent, or Firm* — Alston & Bird LLP (57) ABSTRACT

Device holder assemblies include a first device panel and a second device panel that are configured to selectively couple a first and a second portable computing device to the device holder assembly. The device holder assemblies generally include a spine that is hingedly connected to the first device panel and the second device panel, such that the device holder assembly is repositionable between an open position and a closed position by rotating the first device panel and the second device panel about the spine. The spine may also include a computing entity including driver software that allows the first and second portable computing devices to be operated in conjunction with one another when selectively coupled to the device holder assembly.

20 Claims, 8 Drawing Sheets

(56) References Cited

U.S. PATENT DOCUMENTS

| | | | |
|---|---|---|---|
| 7,782,274 B2* | 8/2010 | Manning | G06F 1/1616 |
| | | | 345/1.3 |
| 8,960,936 B1* | 2/2015 | Malcolm | B42D 3/123 |
| | | | 345/901 |
| 9,415,621 B2* | 8/2016 | Fahrer | B42D 3/00 |
| 9,762,280 B1* | 9/2017 | Munn | H04B 1/3888 |
| 2010/0277443 A1* | 11/2010 | Yamazaki | G06F 1/1616 |
| | | | 345/204 |
| 2012/0244920 A1* | 9/2012 | Lee | H04B 1/3888 |
| | | | 455/575.8 |
| 2015/0111624 A1* | 4/2015 | Peel | H04B 1/3877 |
| | | | 455/575.8 |

\* cited by examiner

DEVICE FOR COORDINATED USE OF MULTIPLE MOBILE COMPUTING DEVICES

CROSS-REFERENCE TO RELATED APPLICATIONS

This application claims priority to and the benefit of U.S. Provisional Patent Application Ser. No. 62/406,039, entitled "Device for Coordinated Use of Multiple Mobile Computing Devices" and filed on Oct. 10, 2016, the entire contents of which as are hereby incorporated by reference.

BACKGROUND

Mobile computing devices, such as tablets, phablets, and the like are increasingly primarily utilized and relied upon for recreation and business purposes. The mobile computing devices provide many of the features of traditional computing devices, while being easily transportable. Mobile computing devices may, for example, provide access to volumes of information in a compact and transportable form, and in some circumstances, mobile computing devices may be utilized in manufacturing and maintenance settings to display technical information related to the assembly and/or maintenance of a component or product to a user.

However, conventional mobile computing devices have limited screen sizes, which accordingly limits the amount of information that may be displayed at a single time. As a non-limiting example, when the mobile computing device is being utilized to display technical information, a user may only be able to view portions of valuable information at a single time (i.e., a maintenance checklist, technical drawings, etc.). Multiple screens may have to be navigated through sequentially, in order for the user to view and/or otherwise obtain all pertinent or desired information.

Accordingly, a need exists for mobile computing device holders that hold and coordinate synchronized operation and utilization of multiple mobile computing devices.

BRIEF SUMMARY

In one embodiment, a device holder assembly includes a first device panel including an outer shell and an inner surface positioned opposite the outer shell, where the inner surface is configured to selectively couple a first portable computing device to the first device panel, a second device panel including an outer shell and an inner surface positioned opposite the outer shell, where the inner surface is configured to selectively couple a second portable computing device to the second device panel, and a central computing entity configured to be communicatively coupled to the first portable computing device and the second portable computing device, the central computing entity including a memory and a processor configured to execute instructions stored in the memory to update data/information presented on the first portable computing device and the second portable computing device in coordination.

In another embodiment, a device holder assembly includes a first device panel including an outer shell and an inner surface positioned opposite the outer shell, where the inner surface is configured to selectively couple a first portable computing device to the first device panel, a second device panel including an outer shell and an inner surface positioned opposite the outer shell, where the inner surface is configured to selectively couple a second portable computing device to the second device panel, a spine pivotally coupled to the first device panel and the second device panel, where the first device panel and the second device panel are repositionable about the spine between an open position and a closed position in which at least a portion of an interior of the device holder assembly is enclosed by the outer shells of the first device panel and the second device panel, and a central computing entity configured to be communicatively coupled to the first portable computing device and the second portable computing device, the central computing entity including a memory and a processor configured to execute instructions stored in the memory to update data/information presented on the first portable computing device and the second portable computing device in coordination.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

Many modifications and other embodiments of the inventions set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein, the vertical direction (i.e., the +/− Z-direction as depicted) refers to the upward/downward direction of the device holder assembly. The longitudinal direction (i.e., the +/− X-direction as depicted) refers to the forward/rearward direction of the device holder assembly and is transverse to the vertical direction. The lateral direction (i.e., the +/− Y-direction as depicted) refers to the cross-wise direction of the device holder assembly and is transverse to the vertical direction and the longitudinal direction.

A device holder assembly for holding one or more portable computing devices is described herein. The device holder assembly generally includes at least a first device panel and a second device panel that are configured to selectively couple a first and a second portable computing device to the device holder assembly. The device holder assembly generally includes a spine that is hingedly connected to the first device panel and the second device panel, such that the device holder assembly is repositionable between an open position and a closed position by rotating the first device panel and the second device panel about the spine. The spine may also include an integrated computing entity including driver software that allows the first and second portable computing devices to be operated in conjunction with one another when selectively coupled to the device holder assembly. By coordinating the operation of the first and second portable computing devices, the device holder assembly assists in presenting related information on both the first and second portable computing devices, and allows the user to operate the first and second portable computing devices as a single unit and/or in a synchronized manner.

Figure 1:
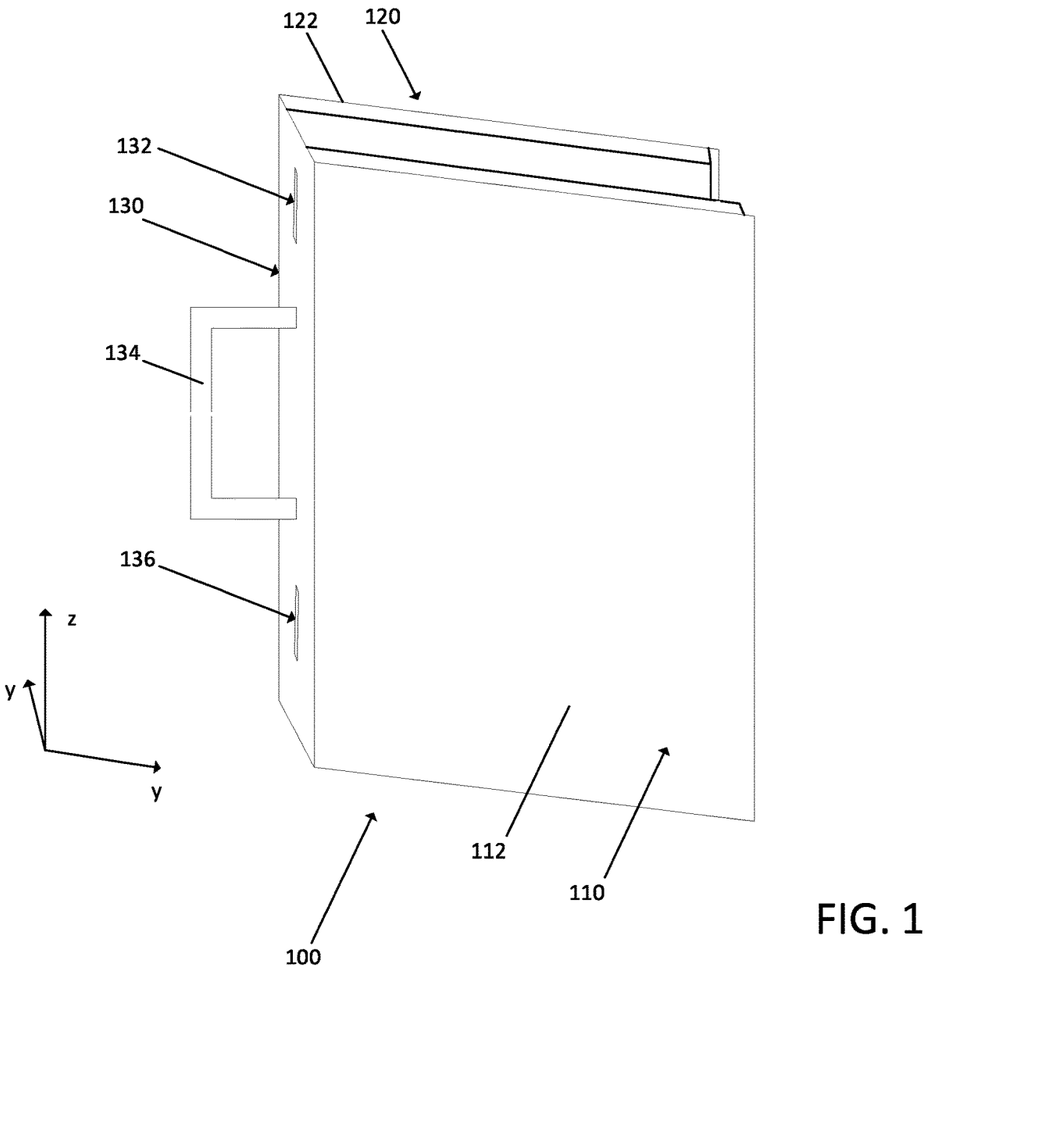
FIG. 1 schematically depicts a perspective view of a device holder assembly in a closed position according to one or more embodiments shown and described herein.
Figure 2:
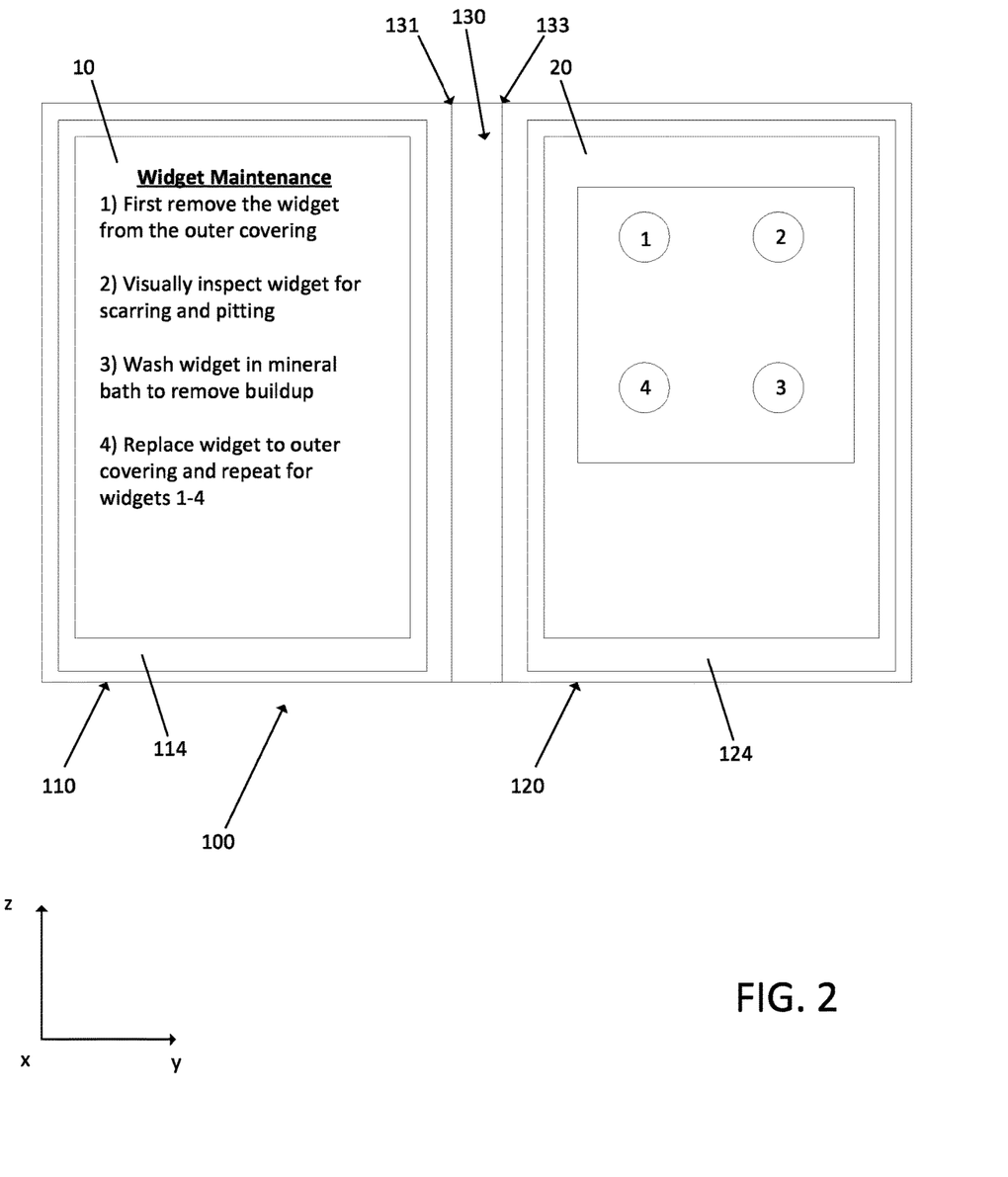
FIG. 2 schematically depicts a front view of the device holder assembly of FIG. 1 in an open position according to one or more embodiments shown and described herein.

Referring initially to FIGS. 1 and 2, a device holder assembly 100 is schematically depicted in a closed position and an open position, respectively. The device holder assembly 100 generally includes a spine 130, a first device panel 110, and a second device panel 120.

The first device panel 110 includes an outer shell 112 and an interior surface 114 positioned opposite the outer shell 112, and the second device panel 120 includes an outer shell 122 and an interior surface 124 positioned opposite the outer shell 122. A first device 10 and a second device 20 are selectively coupled to the first device panel 110 and the second device panel 120, respectively. In particular, the first device 10 is selectively coupled to the interior surface 114 of the first device panel 110 and the second device 20 is selectively coupled to the interior surface 124 of the second device panel 120. The first device 10 and the second device 20 may include, as non-limiting examples, any of a variety of mobile electronic devices, such as a tablet, phablet, smartphone, or other mobile computing devices.

Figure 3:
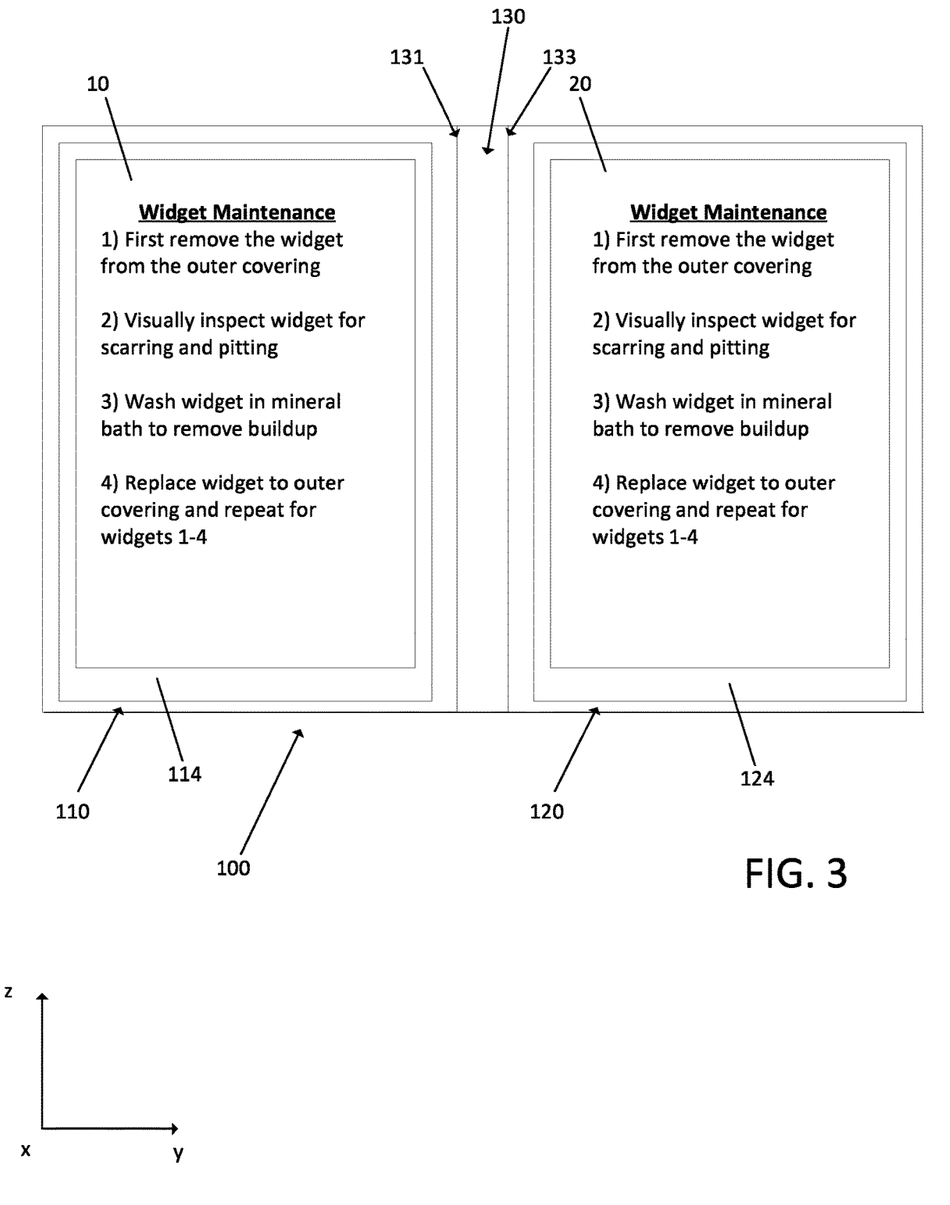
FIG. 3 schematically depicts a front view of the device holder assembly of FIG. 1 in an open position according to one or more embodiments shown and described herein.
Figure 4:
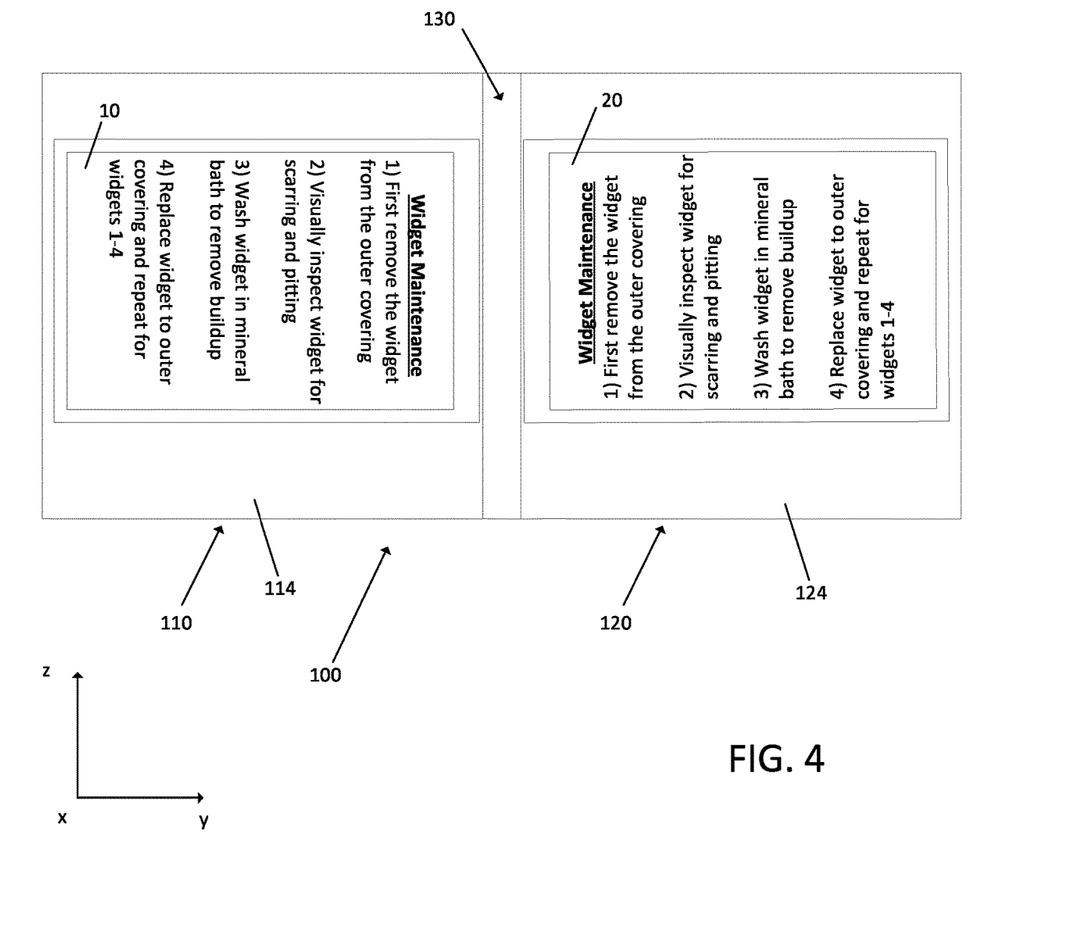
FIG. 4 schematically depicts another front view of the device holder assembly of FIG. 1 in an open position according to one or more embodiments shown and described herein.

Referring to FIGS. 3 and 4, in embodiments, the first device 10 and the second device 20 are pivotally coupled to the interior surface 114 and the interior surface 124 of the first device panel 110 and the second device panel 120. The first device 10 and the second device 20 may be rotated with respect to the interior surface 114 and the interior surface 124 about the x-axis, such that the first device 10 and the second device 20 are repositionable at least between a first position (e.g., a portrait orientation as shown in FIG. 3) and a second position (e.g., a landscape orientation as shown in FIG. 4). In some embodiments, the first device 10 and the second device 20 may be selectively coupled to the interior surfaces 114, 124 of the first device panel 110 and the second device panel 120, for example by hook and loop fasteners, adhesives, or other mechanical connections, such that the first device 10 and the second device 20 are repositionable at least between the first position (FIG. 3) and the second position (FIG. 4) with respect to the first device panel 110 and the second device panel 120. In this way, the first device 10 and the second device 20 may be rotated to orient the first device 10 and the second device 20 as desired within the device holder assembly 100 to display information to a user.

In embodiments, the first device panel 110 and the second device panel 120 are sized to accommodate a tablet oriented in the landscape orientation and the portrait orientation. As a non-limiting example, the first device panel 110 and the second device panel 120 may extend at least 10 inches in the vertical direction and the lateral direction as depicted. Furthermore, the spine 130 may be sized such that the first device 10 and the second device 20 may be at least partially encapsulated within an interior of the device holder assembly 100 in the closed position (e.g. as shown in FIG. 1). As a non-limiting example, the spine 130 may extend at least 10 inches in the vertical direction as depicted and may extend at least 1 inch in the longitudinal direction (to accommodate the thickness of the first device 10 and the second device 20 when the device holder assembly 100 is in the closed position).

Referring again to FIG. 1, the outer shells 112, 122 may be formed from a durable material, such a hard plastic, a polymer, a durable fabric, or the like and may protect the first device 10 and the second device 20 from impact, shock, vibration, or the like, and may also be water resistant/water proof. When the device holder assembly 100 is in the closed position, the outer shells 112, 122 may engage one another to at least partially enclose an interior of the device holder assembly 100. In some embodiments, the outer shells 112, 122 may fully enclose the interior of the device holder assembly 100 in the closed position, such that the first device 10 and the second device 10 coupled to the interior surfaces 114, 124 are fully enclosed by the outer shells 112, 122. The outer shells 112, 122 may further include a latch, lock, magnet, or the like that is configured to retain the device holder assembly 100 in the closed position.

In various embodiments, the first device panel 110 is coupled to the second device panel 120 via the spine 130. The first device panel 110 and the second device panel 120 may be selectively or permanently coupled to the spine 130 in any suitable manner, including, but not limited to, hook and loop fasteners, adhesives, magnets, mechanical fasteners, brackets, or the like. While depicted as a rectangular prism, it should be understood that the spine 130 may include any suitable shape or combinations of shapes, including, but not limited to a cylinder or the like.

In at least the illustrated embodiment, the first device panel 110 and the second device panel 120 are pivotally coupled to the spine 130 at a first hinge 131 and a second hinge 133, respectively. The first device panel 110 and the second device panel 120 are configured to rotate about the first hinge 131 and the second hinge 133 to reposition the device holder assembly 100 between the open position (i.e., as shown in FIG. 2 where the first device panel 110 and the second device panel 120 are in plane with the spine 130), and the closed position (i.e., as shown in FIG. 1). In some embodiments, the first device panel 110 and the second device panel 120 are configured to rotate about the first hinge 131 and the second hinge 133 at a variety of different orientations, and may be configured to rotate about the first hinge 131 and the second hinge 133 such that the first device 10 and the second device 20 are oriented to face away from one another.

Figure 5:
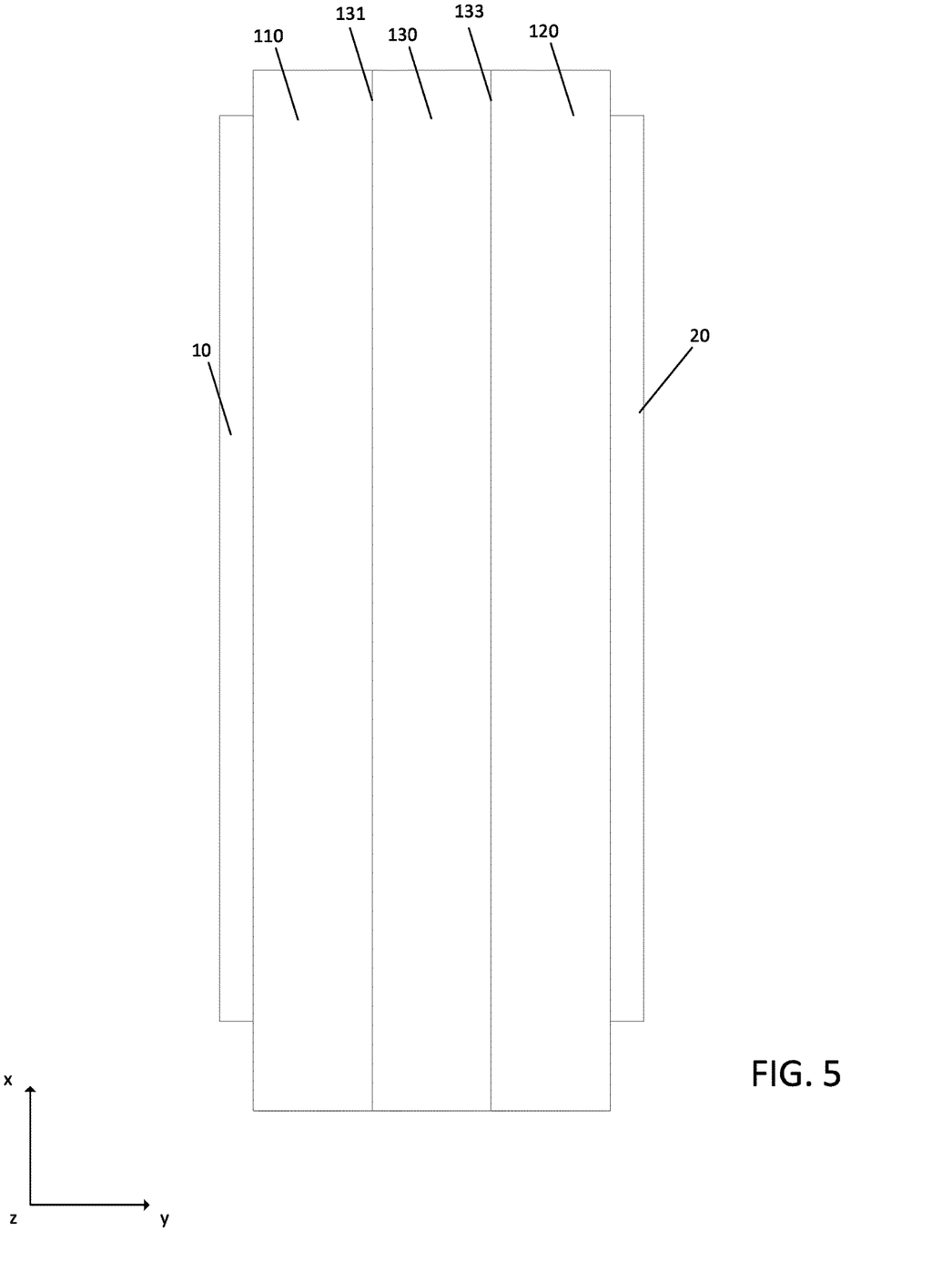
FIG. 5 schematically depicts a top view of the device holder assembly of FIG. 1 in an open position according to one or more embodiments shown and described herein.

For example and referring to FIG. 5, a top view of the device holder assembly 100 is depicted. The hinges 131 and 133 may allow the first device pane 110 and the second device panel 120 to rotate such that the first device 10 and the second device are oriented to face away from one another. By facing the first device 10 and the second device 20 away from one another, the first device 10 and the second device 20 may be utilized by users that are facing one another.

The first hinge 131 and the second hinge 133 may include any suitable construction to allow rotation of the first device panel 110 and the second device panel 120 about the spine 130, for example and not limited to a piano hinge, a continuous hinge, a strap hinge, or the like. In some embodiments, the first hinge 131 and the second hinge 133 may be formed of a flexible material, such as a polymer or fabric that elastically deforms to allow the first device panel 110 and the second device panel 120 to rotate about the spine 130. In some embodiments, the spine 130 itself may be formed from a flexible material, such as a polymer or fabric, and the spine 130 may act as a hinge allowing the first device panel 110 and the second device panel 120 may rotate about the spine 130.

Referring again to FIG. 1, the spine 130 may include loop 134 for carrying the device holder assembly 100. The loop 134 may include a handle that is configured to be gripped by a user to carry the device holder assembly 100. The loop 134 may also serve to hang the device holder assembly 100, such as from a hook or the like. In some embodiments, the device holder assembly 100 may also include a hanger, a folding stand, a leg, or the like for supporting the device holder assembly 100.

In embodiments, the spine 130 may include one or more electrical/communication ports embedded within and accessible from an outer surface of the spine 130. In the embodiment depicted in FIG. 1, the spine 130 includes a communications port 132 and a charging port 136 accessible from the outer surface of the spine 130. The communications port 132 and the charging port 136 facilitate connection to a central computing entity 802 (FIG. 8) of the device holder assembly 100 and a battery of the device holder assembly, as will be described in greater detail herein. While a communications port 132 and a charging port 136 are described herein, it should be understood that the spine 130 may include any suitable ports for connecting to the central computing entity 802 (FIG. 8) and the battery 804 (FIG. 7).

Figure 7:
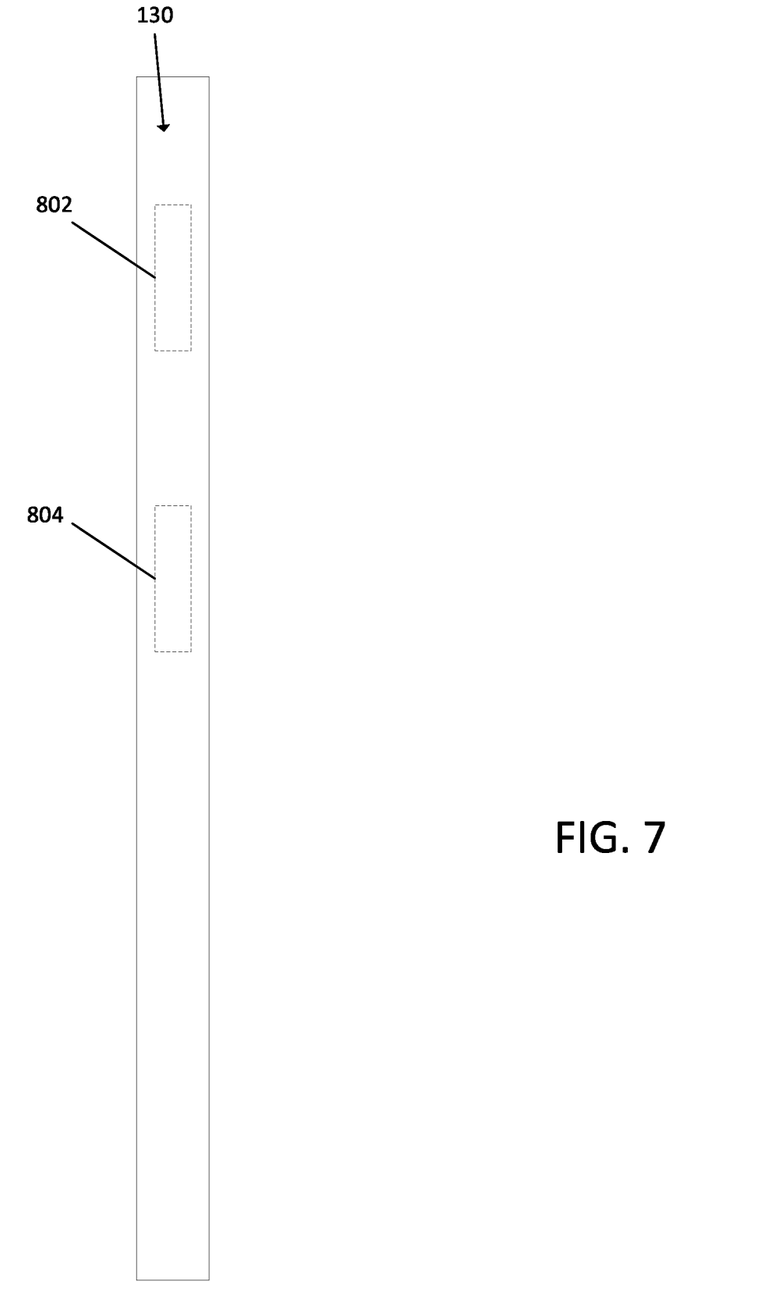
FIG. 7 schematically depicts a spine of the device holder assembly of FIG. 1 in isolation according to one or more embodiments shown and described herein.

Referring to FIG. 7, the spine 130 is depicted in isolation. In embodiments, the central computing entity 802 and the battery 804 are embedded within the spine 130. The battery 804 is electrically coupled to the charging port 136 (FIG. 1) and the central computing entity 802 is communicatively coupled to the communications port 132 (FIG. 1). The battery 804 is also configured to be electrically coupled to the first device 10 and the second device 20 (FIG. 2), and the battery may provide supplemental power to the first device 10 and the second device 20 during operation. The central computing entity 802 is configured to be communicatively coupled to the first device 10 and the second device 20, as will be described in greater detail herein.

Figure 8:
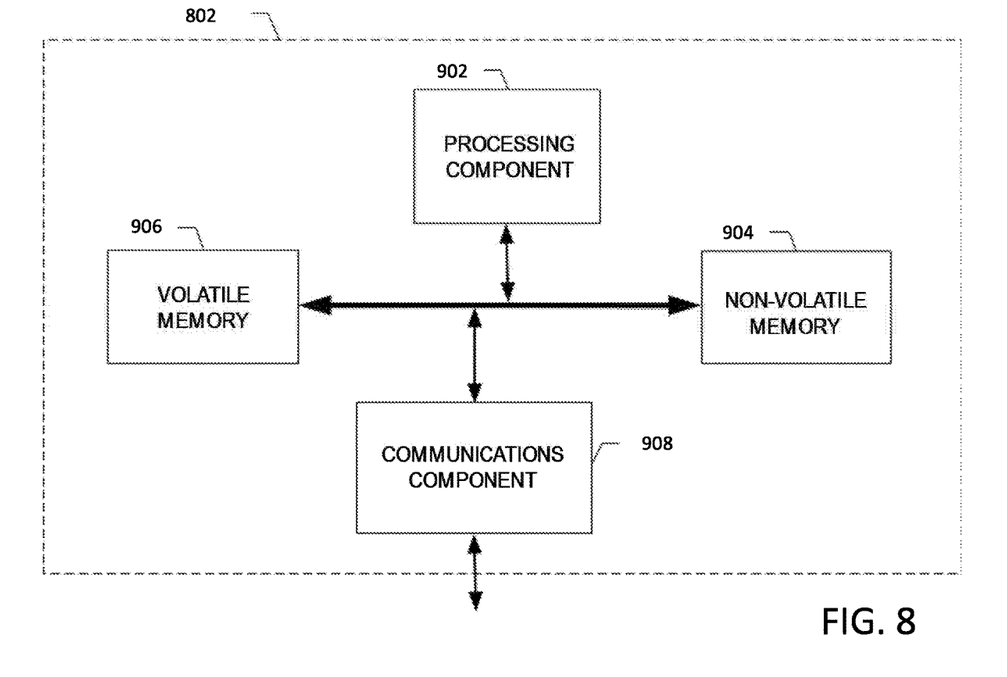
FIG. 8 schematically depicts a central computing entity of the device holder assembly of FIG. 1 according to one or more embodiments shown and described herein.

FIG. 8 provides a schematic of a central computing entity 802 according to one embodiment of the present invention. As indicated, in one embodiment, the central computing entity 802 may also include one or more communications elements/components 908 for communicating with various computing entities, such as by communicating information/data, content, information, and/or similar terms used herein interchangeably that can be transmitted, received, operated on, processed, displayed, stored, and/or the like.

As shown in FIG. 8, in one embodiment, the central computing entity 802 may include or be in communication with one or more processing elements/components 902 (also referred to as processors, processing circuitry, processing device, and/or similar terms used herein interchangeably) that communicate with other elements/components within the central computing entity 802 via a bus, for example. As will be understood, the processing elements/components 902 may be embodied in a number of different ways. For example, the processing element/component 902 may be embodied as one or more CPLDs, "cloud" processors, microprocessors, multi-core processors, coprocessing entities, ASIPs, microcontrollers, and/or controllers. Further, the processing element/component 902 may be embodied as one or more other processing devices or circuitry. The term circuitry may refer to an entirely hardware embodiment or a combination of hardware and computer program products. Thus, the processing element/component 902 may be embodied as integrated circuits, ASICs, FPGAs, PLAs, hardware accelerators, other circuitry, and/or the like. As will therefore be understood, the processing element/component 902 may be configured for a particular use or configured to execute instructions stored in volatile or non-volatile media or otherwise accessible to the processing element/component 902. As such, whether configured by hardware or computer program products, or by a combination thereof, the processing element/component 902 may be capable of performing steps or operations according to embodiments of the present invention when configured accordingly.

In one embodiment, the central computing entity 802 may further include or be in communication with memory components/elements—such as non-volatile media (also referred to as non-volatile storage, memory, memory storage, memory circuitry and/or similar terms used herein interchangeably). In one embodiment, the non-volatile storage or memory may include one or more non-volatile storage or memory media 904, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the memory components/elements may further include or be in communication with volatile media (also referred to as volatile storage, memory, memory storage, memory circuitry and/or similar terms used herein interchangeably). In one embodiment, the volatile storage or memory may also include one or more volatile storage or memory media 906, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element/component 902. Thus, the databases, database instances, database management systems, information/data, applications, programs, program modules, scripts, source code, object code, byte code, compiled code, interpreted code, machine code, executable instructions, and/or the like may be used to control certain aspects of the operation of the central computing entity 802 with the assistance of the processing element/component 902 and operating system.

As indicated, in one embodiment, the central computing entity 802 may also include one or more communications components/elements 908 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Although not shown, the central computing entity 802 may include or be in communication with one or more input components/elements, such as a keyboard input, a mouse input, a touch screen/display input, motion input, movement input, audio input, pointing device input, joystick input, keypad input, and/or the like. The central computing entity 802 may also include or be in communication with one or more output elements/components (not shown), such as audio output, video output, screen/display output, motion output, movement output, and/or the like.

As will be appreciated, one or more of the central computing entity's 802 elements/components may be located remotely from other central computing entity 802 components/elements, such as in a distributed system. That is, the term "central" is used in the generic sense and is not intended to necessarily indicate a central location. Furthermore, one or more of the elements/components may be combined and additional elements/components performing functions described herein may be included in the central computing entity 802. Thus, the central computing entity 802 can be adapted to accommodate a variety of needs and circumstances. As will be recognized, these architectures and descriptions are provided for exemplary purposes only and are not limiting to the various embodiments.

In some embodiments, the central computing entity 802 is positioned in the spine 130 of the device holder assembly 100 and is communicatively coupled to the first device 10 and the second device 20. In some embodiments, the central computing entity 802 is communicatively coupled to the first device 10 and the second device 10 through a wired connection. For example, each of the first device frame 110 and the second device frame 120 may include a receptacle for connecting the first device 10 and the second device (e.g., a male USB connector, a mini male USB connector, a micro male USB connector, a lighting connector, a 30-pin connector, or the like) such that when the first device 10 and the second device 20 are selectively coupled to the device holder assembly 100, the first device 10 and the second device 20 may be selectively connected to the central computing entity 802 through wired connections. In other embodiments, the central computing entity 802 may be communicatively connected to the central computing entity 802 through a wireless connection.

The central computing entity 802 may include driver software, that when executed by the first and/or the second devices 10, 20, allows the first and second devices 10, 20 to be operated in coordination with (e.g., synchronized with) one another. As one example, the first device 10 may display a page of a book/manual/technical document, and a subsequent page of the book/manual/technical document may be displayed on the second device 20. In some configurations, the book/manual/technical document may present related data/information on the first device 10 and the second device 20. For example, as shown in FIG. 2, textual data/information is presented for display on the first device 10 and a related drawing/schematic is presented for display on the second device 20. By simultaneously presenting text and a related drawing/schematic on the first device 10 and the second device 20, technical information including both textual and graphical data/information, such as may be used during a maintenance or assembly operation, may be presented to a user simultaneously via the first device 10 and the second device 20.

When a user engages (i.e., swipes) one or the other of the first and second devices 10, 20, the driver software causes the display of the first and second devices 10 and 20 may be updated in coordination. For example, the driver software may cause the data/information previously displayed on the second device 20 to be presented on the first device 10, and may retrieve new data/information to be displayed on the second device 20, or the driver software may retrieve new data/information to be displayed on the first device 10 and the second device 20 simultaneously. In this way, the driver software may allow the first device 10 and the second device 20 to be utilized in coordination to present new data/information much in the same way that a user would turn the pages of a book.

Furthermore, the driver software of the central computing entity 802 may allow a user to interact with the data/information presented on the first device 10 and the second device 20 simultaneously. As one example and referring to FIG. 2, a user may engage the second device 20, selecting a portion graphical data/information by touching the screen of the second device 20. The central computing entity 802 may receive a signal from the second device 20 indicative of the selected graphical data/information, and the central computing entity 802 may send a signal to the first device 10 causing the first device 10 to highlight portions of text related to the selected graphical data/information of the second device 20. In this way, the driver software of the central computing entity 802 may allow a user to correlate textual data/information presented the first device 10 or the second device 20 with graphical data/information presented on the other of the first device 10 and the second device 20. By allowing a user to interact with the data/information presented on the first device 10 and the second device 20 simultaneously, the driver software may be utilized assist a user reading technical information including both textual and graphical data/information to perform a maintenance or assembly operation.

In some embodiments, the driver software may present a virtual keyboard on one of the first device 10 or the second device 20, and may present a view of what is being typed via the virtual keyboard on the other of the first device and the second device 20. By coordinating the actions of the first device 10 and the second device 20, the device holder assembly 100 allows a user to utilize multiple portable electronic devices simultaneously, which may be advantageous in circumstances where the limited screen size of the devices 10, 20 may limit the use of the portable electronic device. The driver software may be configured to coordinate the operation of the first device 10 and the second device 20 regardless of the manufacturer and the model of the first device 10 and the second device 20, such that the first device 10 and the second device 20 may be utilized together whether the first device 10 and the second device 20 are identical or made by different manufacturers.

In some embodiments, the central computing entity 802 is configured to execute a computer implemented method for synchronously using multiple mobile devices, such as the first device 10 and the second device 20. The central computing entity 802 may receive a signal from the first device 10 or the second device 20 indicative of a user input via the first device 10 or the second device 20. The central computing entity 802 may access a database within the first device 10 or the second device 20, the database including information for display via the first device 10 and the second device 20. In response to receiving the user input, the central computing entity 802 may cause the first device 10 and the second device 20 to present for display, new information received from the database within the first device 10 or the second device 20, presenting the new information in coordination.

Figure 6:
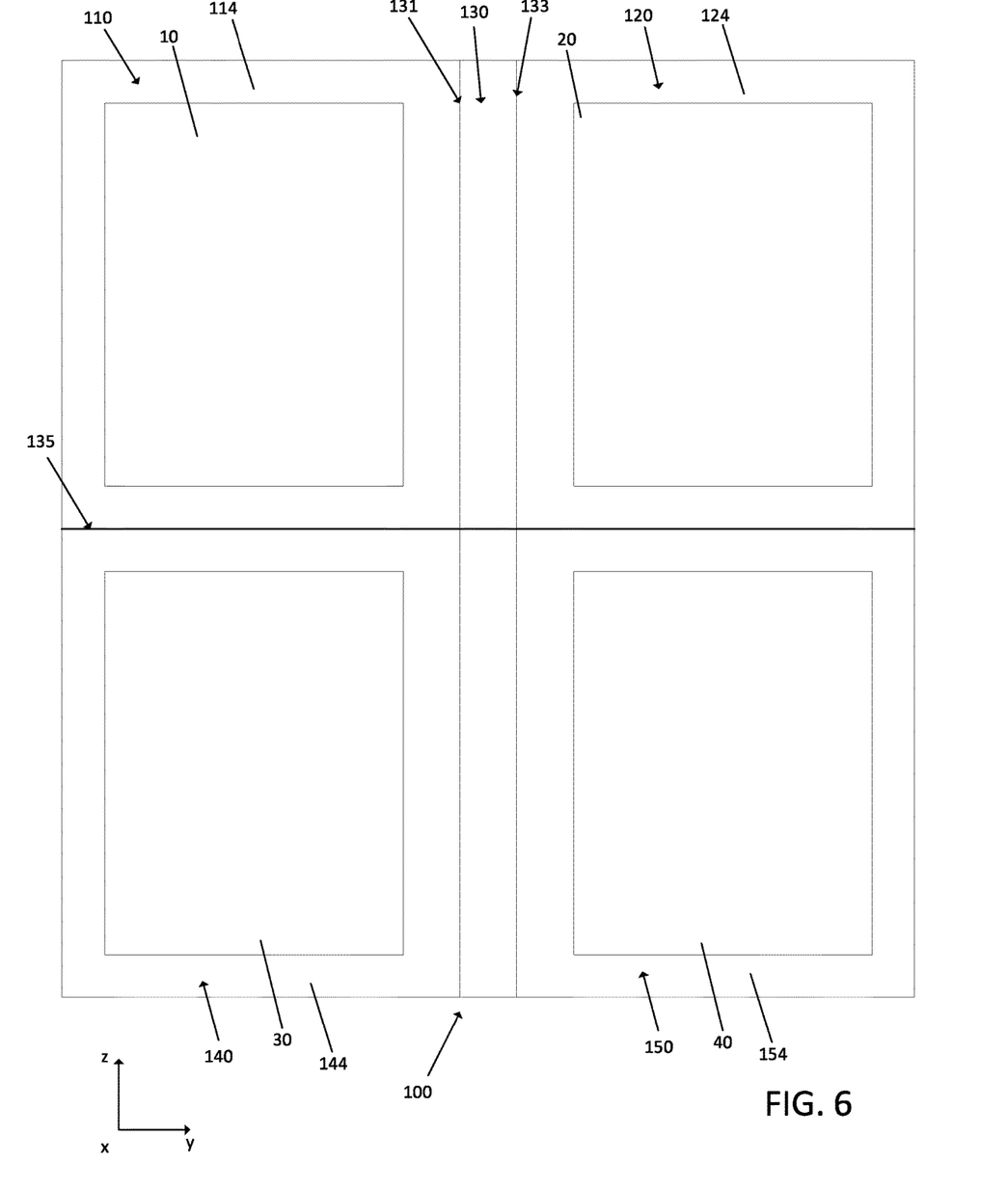
FIG. 6 schematically depicts schematically depicts a front view of another device holder assembly in an open position according to one or more embodiments shown and described herein.

Referring to FIG. 6, a top view of another device holder assembly 100 is depicted. In the embodiment depicted in FIG. 6, the device holder assembly 100 includes the first device panel 110, the second device panel 120, and includes a third device panel 140, and a fourth device panel 150. The third device panel 140 includes an inner surface 144 to which a third device 30 is selectively coupled, and the fourth device panel 150 includes an inner surface 154 to which a fourth device 40 is selectively coupled. The device holder assembly includes the spine 130 including the first hinge 131 and the second hinge 133 extending along the device holder assembly 100. The first hinge 131 pivotally couples the first device panel 110 and the third device panel 140 to the spine 130, and the second hinge 133 pivotally couples the second device panel 120 and the fourth device panel 150 to the spine 130. The device holder assembly 100 additionally includes a transverse hinge 135 that bisects the spine 130 and extends in a direction that is transverse to the first hinge 131 and the second hinge 133. The transverse hinge 135 pivotally couples the first device panel 110 to the third device panel 140 and pivotally couples the second device panel 120 to the fourth device panel 150. The transverse hinge 135 allows the third device panel 140 and the fourth device panel 150 to be rotated upward toward the first device panel 110 and the second device panel 120, such that the device holder assembly 100 can be repositioned into the closed position as shown in FIG. 1. In the closed position, each of the first device panel 110, the second device panel 120, the third device panel 140, and the fourth device panel 150 may be generally oriented parallel to one another. In this way, the device holder assembly 100 may hold four devices that may be used in coordination with one another.

In embodiments including the third device panel and the fourth device panel 150, the spine 130 may be generally sized such that the first device 10, the second device 20, the third device 30, and the fourth device 40 may be at least partially encapsulated within an interior of the device holder assembly 100 in the closed position (e.g. as shown in FIG. 1). As a non-limiting example, the spine 130 may extend at least 10 inches in the vertical direction as depicted and may extend at least 2 inches in the longitudinal direction (to accommodate the thickness of the first device 10, the second device 20, the third device 30, and the fourth device when the device holder assembly 100 is in the closed position).

It should now be understood that the present application is directed to device holder assemblies. The device holder assemblies generally include at least a first device panel and a second device panel that are configured to selectively couple a first and a second portable computing device to the device holder assembly. The device holder assemblies generally include a spine that is hingedly connected to the first device panel and the second device panel, such that the device holder assembly is repositionable between an open position and a closed position by rotating the first device panel and the second device panel about the spine. The spine may also include a computing entity including driver software that allows the first and second portable computing devices to be operated in conjunction with one another when selectively coupled to the device holder assembly. By coordinating the operation of the first and second portable computing devices, the device holder assembly assists in presenting related information on both the first and second portable computing devices, and allows the user to operate the first and second portable computing devices as a single unit.

V. Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device holder assembly comprising:
a first device panel comprising an outer shell and an inner surface positioned opposite the outer shell, wherein the inner surface is configured to selectively couple a first portable computing device to the first device panel;
a second device panel pivotally coupled to the first device panel, the second device panel comprising an outer shell and an inner surface positioned opposite the outer shell, wherein the inner surface is configured to selectively couple a second portable computing device to the second device panel; and
a central computing entity configured to be communicatively coupled to the first portable computing device and the second portable computing device, the central computing entity comprising a memory and a processor configured to execute instructions stored in the memory to update data presented on the first portable computing device and the second portable computing device in coordination, wherein the first portable computing device and the second portable computing device are each independently operable portable computing devices and the central computing entity is configured to coordinate operation of the first and second portable computing devices.

2. The device holder assembly of claim 1, further comprising a spine positioned intermediate one side of the first device panel and one side of the second device panel, wherein the pivotal coupling between the first device panel and the second device panel is provided via the spine.

3. The device holder assembly of claim 2, wherein the spine is pivotally coupled to the first device panel at a first hinge and pivotally coupled to the second device panel at a second hinge.

4. The device holder assembly of claim 3, wherein the first device panel and the second device panel are rotatable about the first hinge and the second hinge such that the first device panel and the second device panel are configured for selective orientation to face away from one another.

5. The device holder assembly of claim 3, wherein the central computing entity is embedded within the spine.

6. The device holder assembly of claim 3, further comprising:
   a third device panel pivotally coupled to the spine at the first hinge; and
   a fourth device panel pivotally coupled to the spine at the second hinge.

7. The device holder assembly of claim 6, further comprising a transverse hinge that bisects the spine and extends in a direction that is transverse to the first hinge and the second hinge.

8. The device holder assembly of claim 1, further comprising a battery configured to be electrically coupled to the first device and the second device.

9. The device holder assembly of claim 8, wherein the battery is embedded within the spine.

10. The device holder assembly of claim 1, wherein the processor of the central computing entity is further configured to execute instructions stored in the memory to:
    receive a signal from one of the first device and the second device, the signal indicative of selected data on the one of the first device and the second device; and
    in response to receipt of the signal from the one of the first device and the second device, cause the other of the first device and the second device to highlight data corresponding to the selected data.

11. The device holder assembly of claim 1, wherein the first device panel and the second device panel are configured to pivotally couple the first device and the second device to the device holder assembly such that the first device and the second device are rotatable with respect to the first device panel and the second device panel about a longitudinal axis that extends in a direction that is transverse to the first device panel and the second device panel.

12. A device holder assembly comprising:
   a first device panel comprising an outer shell and an inner surface positioned opposite the outer shell, wherein the inner surface is configured to selectively couple a first portable computing device to the first device panel;
   a second device panel comprising an outer shell and an inner surface positioned opposite the outer shell, wherein the inner surface is configured to selectively couple a second portable computing device to the second device panel;
   a spine pivotally coupled to the first device panel and the second device panel, wherein the first device panel and the second device panel are repositionable about the spine between an open position, in which the first device and the second device are at least partially exposed, and a closed position in which at least a portion of an interior of the device holder assembly is enclosed by the outer shells of the first device panel and the second device panel; and
   a central computing entity configured to be communicatively coupled to the first portable computing device and the second portable computing device, the central computing entity comprising a memory and a processor configured to execute instructions stored in the memory to update data presented on the first portable computing device and the second portable computing device in coordination,
   wherein the first portable computing device and the second portable computing device are each independently operable portable computing devices and the central computing entity is configured to coordinate operation of the first and second portable computing devices.

13. The device holder assembly of claim 12, wherein the central computing entity is positioned within the spine.

14. The device holder assembly of claim 12, further comprising:
   a third device panel pivotally coupled to the spine; and
   a fourth device panel pivotally coupled to the spine.

15. The device holder assembly of claim 14, further comprising a transverse hinge that bisects the spine and extends in a direction that is transverse to the spine.

16. The device holder assembly of claim 12, further comprising a battery configured to be electrically coupled to the first device and the second device.

17. The device holder assembly of claim 12, wherein the processor of the central computing entity is further configured to execute instructions stored in the memory to:
   receive a signal from one of the first device and the second device, the signal indicative of selected data on the one of the first device and the second device; and
   in response to receipt of the signal from the one of the first device and the second device, cause the other of the first device and the second device to highlight data corresponding to the selected data.

18. The device holder assembly of claim 16, wherein the battery is electrically coupled to a charging port embedded within the spine.

19. The device holder assembly of claim 12, wherein the first device panel and the second device panel are rotatable about spine such that the first device panel and the second device panel are configured for selective orientation to face away from one another.

20. The device holder assembly of claim 12, wherein the first device panel and the second device panel are configured to pivotally couple the first device and the second device to the device holder assembly such that the first device and the second device are rotatable with respect to the first device panel and the second device panel.

* * * * *